(12) United States Patent
Carao et al.

(10) Patent No.: US 11,799,712 B2
(45) Date of Patent: Oct. 24, 2023

(54) SYSTEM FOR INTEGRATION AND INTEROPERABILITY BETWEEN DISPARATE DISTRIBUTED SERVER TECHNOLOGIES

(71) Applicant: BANK OF AMERICA CORPORATION, Charlotte, NC (US)

(72) Inventors: Alejandro Jose Carao, Atlanta, GA (US); Govinda Rajulu Nelluri, Telangana (IN); Srinivasa Rao Dakshinyam, Telangana (IN); Christine Meloro Hill, Charlotte, NC (US); Lalit Dhawan, Franklin Park, NJ (US); Anup C. Menon, Scarsdale, NY (US); Donald S. Curtis, Charlotte, NC (US); Sudhaker Raj, Plainsboro, NJ (US); Robert Julian Oddy, London (GB); Claire A. Rolfes, New York, NY (US); Sumita Desai, Jacksonville, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/723,068

(22) Filed: Apr. 18, 2022

(65) Prior Publication Data
US 2022/0239546 A1  Jul. 28, 2022

Related U.S. Application Data

(63) Continuation of application No. 17/170,377, filed on Feb. 8, 2021, now abandoned.
(Continued)

(51) Int. Cl.
H04L 41/02 (2022.01)
H04L 67/10 (2022.01)
(Continued)

(52) U.S. Cl.
CPC ......... *H04L 41/02* (2013.01); *G06F 16/2379* (2019.01); *G06F 16/27* (2019.01);
(Continued)

(58) Field of Classification Search
None
See application file for complete search history.

(56) References Cited

U.S. PATENT DOCUMENTS 7,698,398 B1   4/2010  Lai
7,890,517 B2   2/2011  Angelo et al.
(Continued)

*Primary Examiner* — Lashonda Jacobs-Burton
(74) *Attorney, Agent, or Firm* — Moore & Van Allen PLLC; Seongun M. Hong

(57) ABSTRACT

A system for integration and interoperability between disparate distributed server technologies is provided. In particular, the system may provide communications functionality between heterogenous distributed register technology networks. In this regard, the system may establish an interoperability layer between the disparate networks to allow cross-network process flows to be executed. The interoperability layer may comprise one or more network services nodes for each distributed register technology to be integrated by the system. Each network services nodes may act as an event handler for internal processes executed within a given distributed register network and be configured to send and receive data from other network services nodes regarding the execution of such processes. The respective network services may then use the data obtained regarding such internal processes to in turn execute its own processes. In this way, the system may efficiently integrate networks using disparate distributed register technologies.

12 Claims, 3 Drawing Sheets

Related U.S. Application Data

(60) Provisional application No. 62/971,493, filed on Feb. 7, 2020.

(51) Int. Cl.

| | |
|---|---|
| *H04L 9/40* | (2022.01) |
| *G06F 16/23* | (2019.01) |
| *H04L 47/783* | (2022.01) |
| *G06F 16/27* | (2019.01) |
| *H04L 67/1097* | (2022.01) |
| *G06F 9/46* | (2006.01) |
| *G06F 16/185* | (2019.01) |

(52) U.S. Cl.
CPC .......... *H04L 47/783* (2013.01); *H04L 63/102* (2013.01); *H04L 67/10* (2013.01); *H04L 67/1097* (2013.01); *G06F 9/466* (2013.01); *G06F 16/185* (2019.01)

(56) References Cited

U.S. PATENT DOCUMENTS

| | | | |
|---|---|---|---|
| 8,069,435 B1 | 11/2011 | Lai | |
| 8,234,704 B2 | 7/2012 | Ghai et al. | |
| 8,346,929 B1 | 1/2013 | Lai | |
| 8,448,170 B2 | 5/2013 | Wipfel et al. | |
| 8,935,275 B2 | 1/2015 | Rathod | |
| 8,972,599 B2 | 3/2015 | Christensen et al. | |
| 9,197,694 B2 | 11/2015 | Palmeri et al. | |
| 10,082,786 B2 | 9/2018 | Sait et al. | |
| 10,374,821 B2 | 8/2019 | Ansari et al. | |
| 10,423,309 B2 | 9/2019 | Kitchen et al. | |
| 10,475,030 B2 * | 11/2019 | Castinado | G06Q 20/401 |
| 10,523,593 B2 | 12/2019 | Saavedra | |
| 10,666,523 B2 | 5/2020 | Dawes et al. | |
| 10,691,715 B2 | 6/2020 | Wesley, Sr. et al. | |
| 10,992,593 B2 * | 4/2021 | Reston | G06F 9/547 |
| 11,064,057 B2 | 7/2021 | Sabella et al. | |
| 11,184,322 B2 | 11/2021 | Dawes et al. | |
| 11,475,438 B2 * | 10/2022 | Castinado | G06Q 20/389 |
| 2017/0054594 A1 | 2/2017 | Decenzo et al. | |
| 2017/0070361 A1 | 3/2017 | Sundermeyer et al. | |
| 2018/0204213 A1 * | 7/2018 | Zappier | H04L 9/3239 |
| 2018/0349621 A1 * | 12/2018 | Schvey | H04L 63/04 |
| 2019/0034922 A1 * | 1/2019 | Castinado | G06Q 20/389 |
| 2019/0182213 A1 | 6/2019 | Saavedra et al. | |
| 2019/0287200 A1 * | 9/2019 | Schuler | G06Q 50/265 |
| 2019/0334912 A1 * | 10/2019 | Sloane | H04L 9/0637 |
| 2019/0384834 A1 * | 12/2019 | Nelluri | H04L 9/0643 |
| 2020/0042913 A1 * | 2/2020 | Kumar | G06Q 10/0631 |
| 2020/0202035 A1 * | 6/2020 | Wang | G06F 21/54 |
| 2020/0286051 A1 * | 9/2020 | Kade | G06Q 20/10 |
| 2020/0394154 A1 * | 12/2020 | Blackshear | H04L 9/50 |
| 2020/0394648 A1 * | 12/2020 | Blackshear | G06Q 20/3823 |
| 2021/0111998 A1 | 4/2021 | Saavedra | |

* cited by examiner

SYSTEM FOR INTEGRATION AND INTEROPERABILITY BETWEEN DISPARATE DISTRIBUTED SERVER TECHNOLOGIES

CROSS-REFERENCE TO RELATED APPLICATION

This application is a continuation of U.S. patent application Ser. No. 17/170,377 filed Feb. 8, 2021 and titled "SYSTEM FOR INTEGRATION AND INTEROPERABILITY BETWEEN DISPARATE DISTRIBUTED SERVER TECHNOLOGIES," which is a non-provisional application of and claims priority to U.S. Provisional Patent Application No. 62/971,493 filed Feb. 7, 2020 and titled "SYSTEM FOR INTEGRATION AND INTEROPERABILITY BETWEEN DISPARATE DISTRIBUTED SERVER TECHNOLOGIES." The foregoing applications are hereby incorporated by reference in their entireties.

FIELD OF THE INVENTION

The present disclosure embraces a system for integration and interoperability between disparate distributed server technologies.

BACKGROUND

There is a need for an efficient and secure way to establish communication channels between servers operating on different protocols.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for integration and interoperability between disparate distributed server technologies. In particular, the system may provide communications functionality between heterogenous distributed register technology networks. In this regard, the system may establish an interoperability layer between the disparate networks to allow cross-network process flows to be executed. The interoperability layer may comprise one or more network services nodes for each distributed register technology to be integrated by the system. Each network services nodes may act as an event handler for internal processes executed within a given distributed register network and be configured to send and receive data from other network services nodes regarding the execution of such processes. The respective network services may then use the data obtained regarding such internal processes to in turn execute its own processes. In this way, the system may efficiently integrate networks using disparate distributed register technologies.

Accordingly, embodiments of the present disclosure provide a system for integration and interoperability between disparate distributed server technologies, the system comprising a memory device with computer-readable program code stored thereon; a communication device; and a processing device operatively coupled to the memory device and the communication device, wherein the processing device is configured to execute the computer-readable program code to generate, within a first distributed server network, a pending data record comprising a request to execute a resource transfer; validate the resource transfer via a first consensus mechanism; append the pending data record to a first distributed register implemented on a first distributed register technology; and transmit, via a first network services node, information associated with the resource transfer to a second network services node of a second distributed server network.

In some embodiments, the second network services node is configured to receive the information associated with the resource transfer; generate a second pending data record comprising the information associated with the resource transfer; validate the second pending data record via a second consensus mechanism; and append the second pending data record to a second distributed register implemented on a second distributed register technology.

In some embodiments, the first distributed register technology is different from the second distributed register technology.

In some embodiments, the second network services node is configured to execute a smart contract to automatically transmit a notification to the first network services node, wherein the notification indicates that the second pending data record has been validated by the second network services node.

In some embodiments, validating the first pending data record comprises performing one or more validation checks on the information associated with the resource transfer.

In some embodiments, the one or more validation checks comprises verification of user information and account information.

Embodiments of the present disclosure also provide a computer program product for integration and interoperability between disparate distributed server technologies, the computer program product comprising at least one non-transitory computer readable medium having computer-readable program code portions embodied therein, the computer-readable program code portions comprising executable code portions for generating, within a first distributed server network, a pending data record comprising a request to execute a resource transfer; validating the resource transfer via a first consensus mechanism; appending the pending data record to a first distributed register implemented on a first distributed register technology; and transmitting, via a first network services node, information associated with the resource transfer to a second network services node of a second distributed server network.

In some embodiments, the computer-readable program code portions further comprise executable code portions for receiving the information associated with the resource transfer; generating a second pending data record comprising the information associated with the resource transfer; validating the second pending data record via a second consensus mechanism; and appending the second pending data record to a second distributed register implemented on a second distributed register technology.

In some embodiments, the first distributed register technology is different from the second distributed register technology.

In some embodiments, the second network services node is configured to execute a smart contract to automatically transmit a notification to the first network services node, wherein the notification indicates that the second pending data record has been validated by the second network services node.

In some embodiments, validating the first pending data record comprises performing one or more validation checks on the information associated with the resource transfer.

In some embodiments, the one or more validation checks comprises verification of user information and account information.

Embodiments of the present disclosure also provide a computer-implemented method for integration and interoperability between disparate distributed server technologies, wherein the computer-implemented method comprises generating, within a first distributed server network, a pending data record comprising a request to execute a resource transfer; validating the resource transfer via a first consensus mechanism; appending the pending data record to a first distributed register implemented on a first distributed register technology; and transmitting, via a first network services node, information associated with the resource transfer to a second network services node of a second distributed server network.

In some embodiments, the computer-implemented method further comprises receiving the information associated with the resource transfer; generating a second pending data record comprising the information associated with the resource transfer; validating the second pending data record via a second consensus mechanism; and appending the second pending data record to a second distributed register implemented on a second distributed register technology.

In some embodiments, the first distributed register technology is different from the second distributed register technology.

In some embodiments, the second network services node is configured to execute a smart contract to automatically transmit a notification to the first network services node, wherein the notification indicates that the second pending data record has been validated by the second network services node.

In some embodiments, validating the first pending data record comprises performing one or more validation checks on the information associated with the resource transfer.

In some embodiments, the one or more validation checks comprises verification of user information and account information. The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
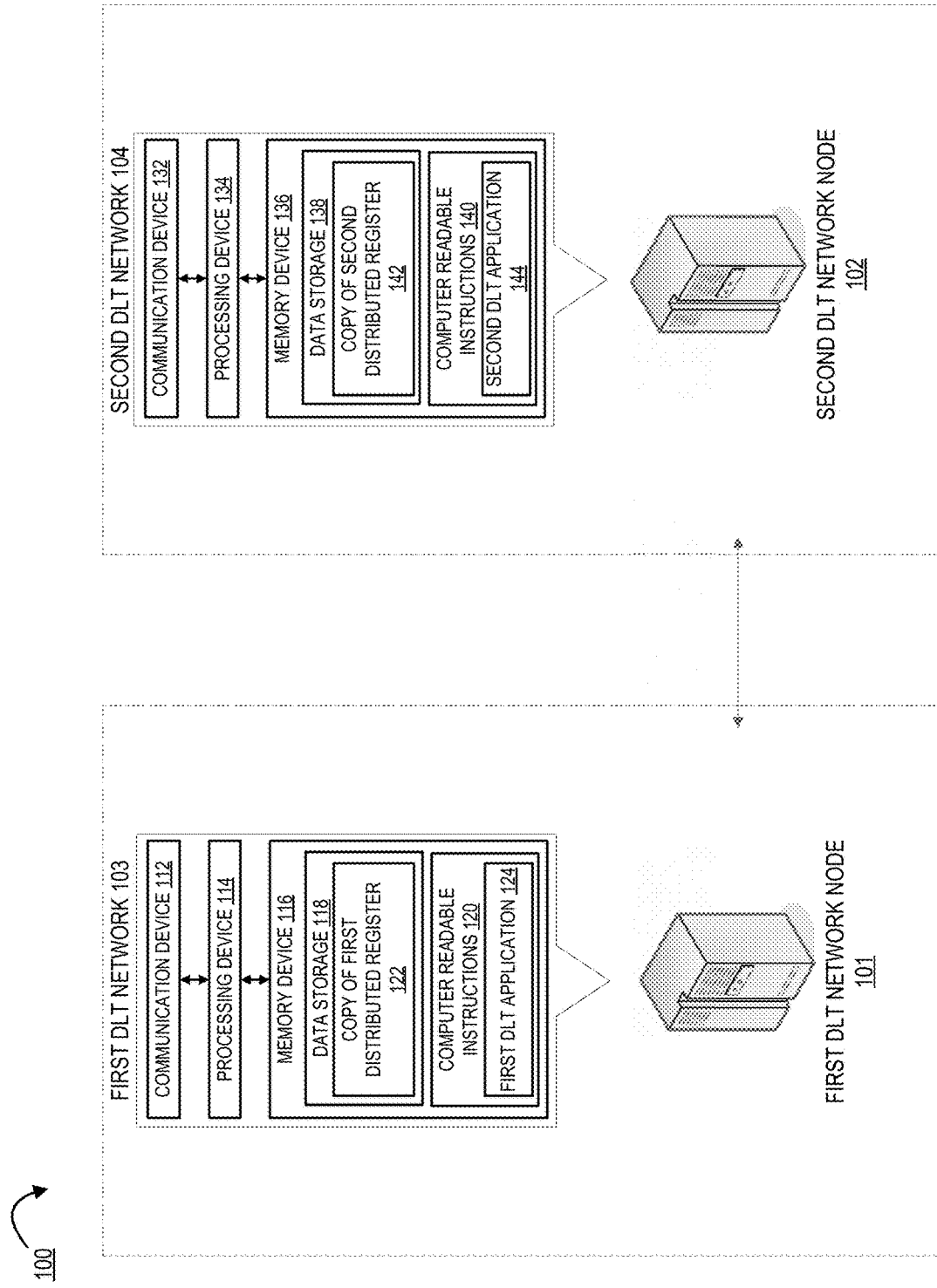
Figure 2:
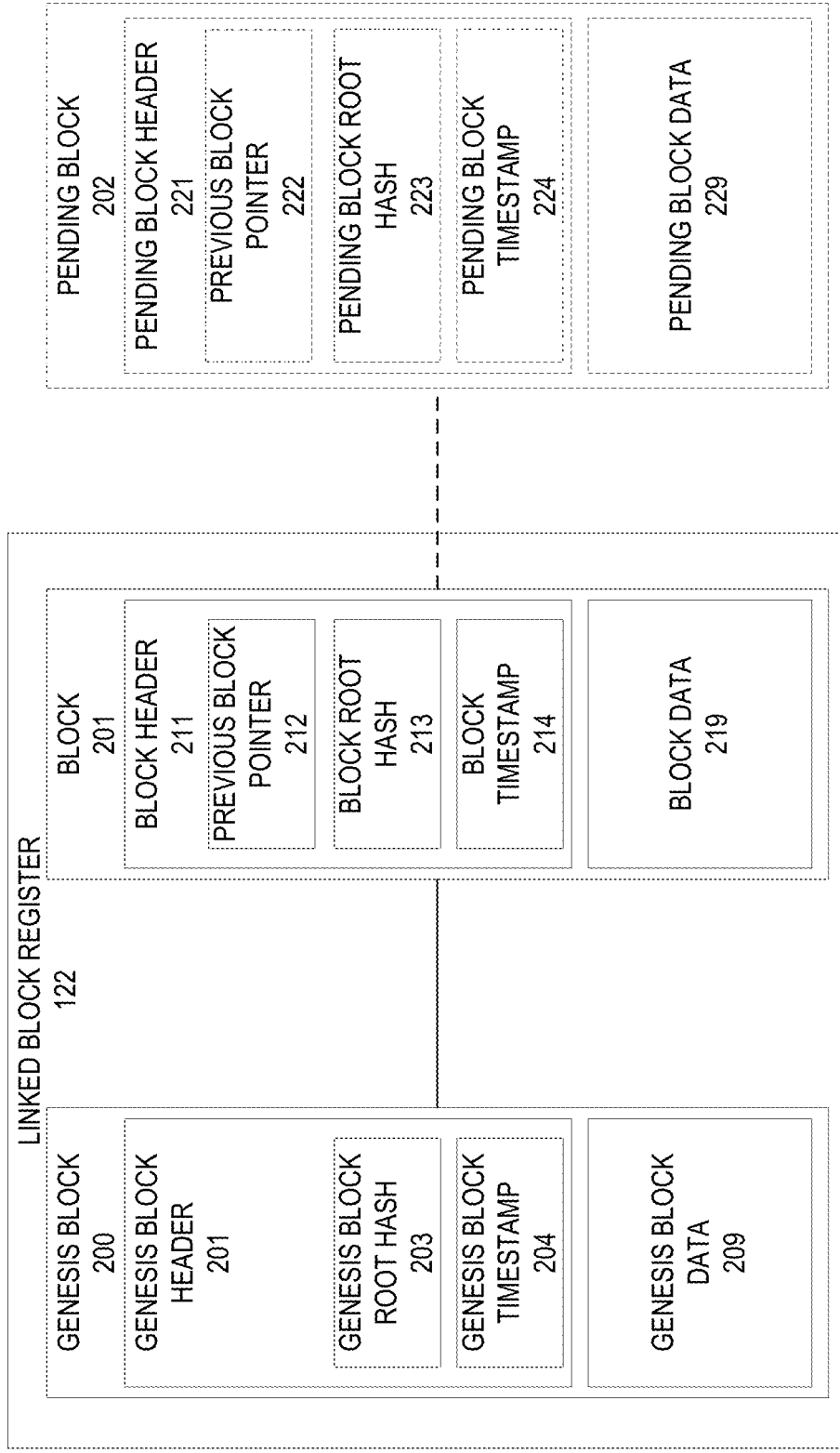
Figure 3:
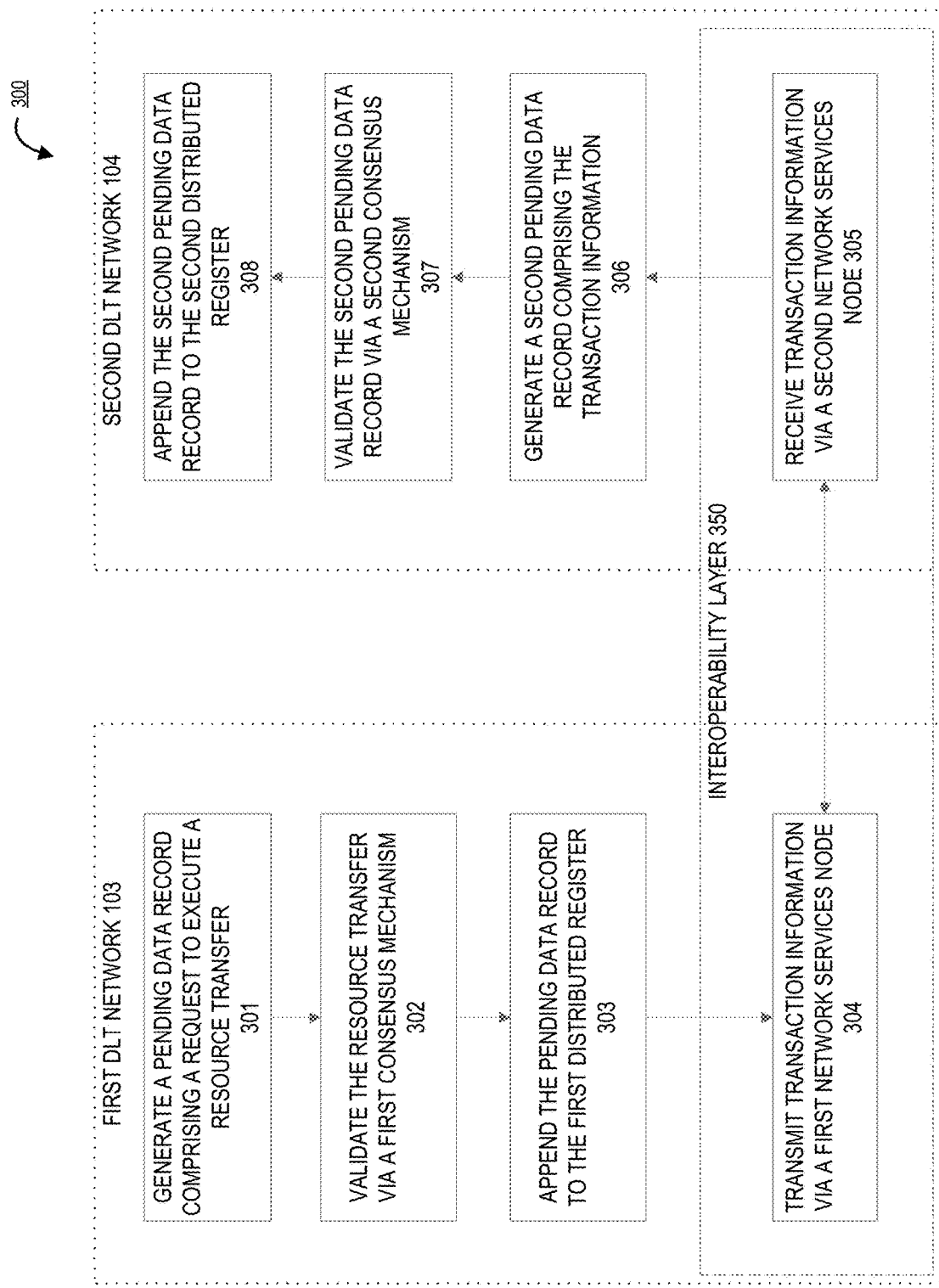

Having thus described embodiments of the invention in general terms, reference will now be made to the accompanying drawings, wherein:

FIG. 1 illustrates an operating environment for the distributed register interoperability system, in accordance with one embodiment of the present disclosure;

FIG. 2 is a block diagram illustrating the data structures within an exemplary linked block register, in accordance with one embodiment of the present disclosure; and FIG. 3 illustrates a combination block and flow diagram illustrating the logical structures and processes of the distributed register interoperability system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," or "distributed ledger" as used herein may refer to a structured list of data records that is decentralized and distributed amongst a plurality of computing systems and/or devices. In some embodiments, the distributed register may be a linked block register.

"Linked block structure" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block register. In this way, beginning from an originating block (e.g., a "genesis block"), each block in the linked block structure is linked to another block via the pointers within the block headers. If the data or metadata within a particular block in the linked block register becomes corrupted or modified, the hash values found in the header of the affected block and/or the downstream blocks may become mismatched, thus allowing the system to detect that the data has been corrupted or modified. In some embodiments, the linked block structure may be a blockchain data structure.

A "linked block register" may refer to a distributed register which uses linked block data structures. Generally, a linked block register is an "append only" ledger in which the data within each block within the linked block register may not be modified after the block is added to the linked block register; data may only be added in a new block to the end of the linked block register. In this way, the linked block register may provide a practically immutable ledger of data records over time.

"Permissioned linked block register" as used herein may refer to a linked block register for which an access control mechanism is implemented such that only known, authorized users may take certain actions with respect to the linked block register (e.g., add new data records, participate in the consensus mechanism, or the like). Accordingly, "unpermissioned linked block register" as used herein may refer to a linked block register without an access control mechanism.

"Private linked block register" as used herein may refer to a linked block register accessible only to users or devices that meet specific criteria (e.g., authorized users or devices of a certain entity or other organization). Accordingly, a "public linked block register" is a linked block register accessible by any member or device in the public realm.

"Node" as used herein may refer to a computing system on which the distributed register is hosted. In some embodiments, each node maintains a full copy of the distributed register. In this way, even if one or more nodes become unavailable or offline, a full copy of the distributed register may still be accessed via the remaining nodes in the distributed register system. That said, in some embodiments, the nodes may host a hybrid linked block register such that certain nodes may store certain segments of the linked block register but not others.

"Consensus," "consensus algorithm," or "consensus mechanism" as used herein may refer to the process or processes by which nodes come to an agreement with respect to the contents of the distributed register. Changes to the ledger (e.g., addition of data records) may require consensus to be reached by the nodes in order to become a part of the authentic version of the ledger. In this way, the consensus mechanism may ensure that each node maintains a copy of the distributed register that is consistent with the copies of the distributed register hosted on the other nodes; if the copy of the distributed register hosted on one node becomes corrupted or compromised, the remaining nodes may use the consensus algorithm to determine the "true" version of the distributed register. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed register, where the self-executing code may be executed when the condition precedent is detected by the system on which the smart contract is stored.

Embodiments of the present disclosure provide a system for integration and interoperability between disparate distributed server technologies. Accordingly, the system may comprise one or more networked computing systems which may host ledgers which may be implemented on various different types of distributed server or distributed ledger technology ("DLT") networks. The system may comprise a first DLT network comprising one or more nodes, where the one or more nodes may comprise a network services node. The network services node of the first DLT network may include an event handler function which tracks the processes executed within the first DLT network (e.g., execution of transactions, consensus/data record validation, and the like). The network services node of the first DLT network may further be in operative communication with a network services node of a second DLT network, which may include an event handler function that tracks processes executed within the second DLT network. The second DLT network may be separate and independent from the first DLT network such that the nodes of the first DLT network may not be communicatively compatible with the nodes of the second DLT network, except for the respective network services nodes. Accordingly, the network services node of the first DLT network may, together with the network services node of the second DLT network, form an interoperability layer between the first DLT network and the second DLT network. By establishing back-and-forth communication compatibility between the network services nodes, the system may allow for the coordination and execution of processes across disparate, formerly incompatible DLT networks.

An exemplary use case is provided as follows for illustrative purposes. A first set of entities (e.g., financial institutions) may each own and/or operate a node which hosts a distributed register implemented using a first distributed register technology (e.g., a first DLT network), and a second set of entities may each own and/or operate a node which hosts a distributed register implemented using a second distributed register technology (e.g., a second DLT network). The respective DLT networks may store various types of information regarding the processes of the entities that make up the DLT networks. For instance, the first DLT network may comprise information associated with one or more entities within the first set of entities such as transaction data (obligations, settlements, balances, and the like), account information, client information, consensus outcomes, and the like. Likewise, the second DLT network may comprise such information associated with one or more entities within the second set of entities.

In such a scenario, the nodes of the first DLT network may not be able to directly read the information hosted within the second DLT network, and conversely, the nodes of the second DLT network may not be able to directly read the information hosted within the first DLT network, as the first DLT network and second DLT network may use different distributed register technologies (e.g., different data structures, consensus mechanisms, encryption requirements, smart contracts, protocols, and the like). Accordingly, the first DLT network may comprise a network services node which tracks the information and processes within the first DLT network. The network services node of the first DLT network may be configured to be compatible with the nodes of the first DLT network (and the distributed register hosted thereon) as well as a network service node of the second DLT network, which may be configured to be compatible with the nodes of the second DLT network (and the distributed register hosted hereon). In such a configuration, the network services node of the first DLT network may be able to send reports regarding the information and processes within the first DLT network to a network services node of the second DLT network. Thus, the network services nodes of the first DLT network and second DLT network may form an interoperability layer between the two DLT networks. The interactions between the network services nodes may be automatically executed via smart contracts implemented on each of the DLT networks using the respective distributed register technologies and/or platforms.

In an exemplary embodiment, a client of an entity within the first set of entities (e.g., a first entity) may wish to execute a transaction (e.g., a transfer of resources) to a client of an entity within the second set of entities (e.g., a second entity). The first entity's node may submit a request to append a data record to the distributed register hosted on the first DLT network, where the data record comprises the information needed to complete the transaction (e.g., account balance, account information, recipient information, and the like). The nodes within the first DLT network may perform validation checks on the proposed data record as part of the consensus mechanism of the first DLT network (e.g., verify that the account and account holder information are correct for both the sender and recipient, verify that the account has enough resources to execute the transaction, and the like). Once the proposed data record has been validated, the proposed data record may be appended to the distributed register. Meanwhile, the network services node of the first DLT network may transmit a signal to the network services node of the second DLT network, where the signal may comprise the information associated with the transaction. The network services node of the second DLT network may distribute the information to the other nodes of the second DLT network, which may subsequently, based on the information, automatically execute processes to complete the transaction (e.g., perform clearing, update account balances, and the like).

Turning now to the figures, FIG. 1 illustrates an operating environment 100 for the distributed register interoperability system, in accordance with one embodiment of the present disclosure. In particular, FIG. 1 illustrates a first DLT network node 101 and a second DLT network node 102. The first DLT network node 101 may be a part of a first DLT network 103, where each node within the first DLT network 103 maintains a copy of a first distributed register 122. Likewise, the second DLT network node 102 may be a part of a second DLT network 104, where each node within the second DLT network 104 maintains a copy of a second distributed register 142. In some embodiments, the first DLT network node 101 may be communicatively coupled to the second DLT network node 102. In such embodiments, the first DLT network node 101 may be a network services node of the first DLT network 103, and the second DLT network node 102 may be a network services node of the second DLT network 104. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though FIG. 1 depicts a single first DLT network node 101 and a single second DLT network node 102, the operating environment may comprise multiple first DLT network nodes 101 and/or multiple second DLT network nodes 102.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the first DLT network node 101 may be a part of the first DLT network 103. In this regard, the first DLT network node 101 may be, for example, a networked terminal, server, desktop computer, or the like, though it is within the scope of the disclosure for the first DLT network node 101 to be a portable device such as a cellular phone, smart phone, smart device, personal data assistant (PDA), laptop, or the like. The first DLT network node 101 may comprise a communication device 112, a processing device 114, and a memory device 116, where the processing device 114 is operatively coupled to the communication device 112 and the memory device 116. The processing device 114 uses the communication device 112 to communicate with the network and other devices on the network. As such, the communication device 112 generally comprises a modem, antennae, WiFi or Ethernet adapter, radio transceiver, or other device for communicating with other devices on the network.

The memory device 116 comprises computer-readable instructions 120 and data storage 118, where the data storage 118 may comprise a copy of the first distributed register 122. The first distributed register (and the copy of the first distributed register 122) may comprise a series of data records relevant to the objectives of an entity associated with the first DLT network 103. For instance, the first distributed register may comprise a series of data records containing data regarding processes or transactions related to such entity, as described elsewhere herein. The computer-readable instructions 120 may have a first DLT application 124 stored thereon, where the first DLT application 124 which may track the information and/or processes within the first distributed register. The first DLT application 124 may further be configured to send and receive information to and from the second DLT network node 102.

As further illustrated in FIG. 1, the second DLT network node 102 may be a part of the second DLT network 104 and comprise a communication device 132, a processing device 134, and a memory device 136. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 132, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

The processing device 134 is operatively coupled to the communication device 132 and the memory device 136. The processing device 134 uses the communication device 132 to communicate with the network and other devices on the network, such as, but not limited to the first DLT network node 101. The communication device 132 generally comprises a modem, antennae, WiFi or Ethernet adapter, radio transceiver, or other device for communicating with other devices on the network.

In some embodiments, the memory device 136 may further include data storage 138 which may comprise a copy of the second distributed register 142. The second distributed register may contain various types of information relating to an entity associated with the second DLT network 104. The memory device 136 may have computer-readable instructions 140 stored thereon, which may further comprise a second DLT application 144. The second DLT application 144 may allow the second DLT network node 102 to send and receive information to and from the first DLT network node 101.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the client node 104 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary linked block register, in accordance with some embodiments. In particular, FIG. 2 depicts a plurality of blocks 200, 201 within the linked block register 122, in addition to a pending block 202 that has been submitted to be appended to the linked block register 122. The linked block register 122 may comprise a genesis block 200 that serves as the first block and origin for subsequent blocks in the linked block register 122. The genesis block 200, like all other blocks within the linked block register 122, comprise a block header 201 and block data 209. The genesis block data 209, or any other instances of block data within the linked block register 122 (or any other distributed register) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the linked block register 122. In some embodiments, the timestamp may be a Unix timestamp. In some embodiments, particularly in linked block registers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block register. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the linked block register 122, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the linked block register to pass the validation checks imposed by the consensus algorithm. Thus, the computational impracticability of altering data records in a linked block register in turn greatly reduces the probability of improper alteration of data records.

A pending block 202 or "proposed block" may be submitted for addition to the linked block register 122. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block register, produces a hash value that falls under a specified threshold value. For instance, the PoW algorithm may require that said hash value begins with a certain number of zeroes. Once said nonce value is determined by one of the nodes in the linked block register, the node may post the "solution" to the other nodes in the linked block register. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the linked block register 122. A pending block timestamp 224 may also be added to signify the time at which the pending block 202 is added to the linked block register 122.

In other embodiments, the consensus mechanism may be based on a total number of consensus inputs submitted by the nodes of the linked block register 122, e.g., a PBFT consensus mechanism. Once a threshold number of consensus inputs to validate the pending block 202 has been reached, the pending block 202 may be appended to the linked block register 122. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 is a combination block and process flow 300 diagram for the distributed register interoperability system, in accordance with one embodiment of the present disclosure. The process begins within the first DLT network 103 at block 301, where the system generates a pending data record comprising a request to execute a resource transfer. In such an embodiment, the pending data record may comprise information such as user information/identity, account information, account balance, recipient account information, transaction parameters (e.g., transaction amount, timeframe, and the like), and the like. The request to execute a resource transfer may be, for instance, a transaction request from a client of an entity within the first DLT network 103 to a client of an entity within the second DLT network 104. In some embodiments, the first distributed register of the first DLT network 103 may be implemented using a different distributed register technology from that of the second distributed register of the second DLT network 104. Accordingly, the system may provide automated interaction and settlement capabilities between the two heterogeneous distributed registers.

The process continues to block 302, where the system validates the resource transfer via a first consensus mechanism. The first consensus mechanism may be unique to the first DLT network 103, and may comprise one or more validation checks on the pending data record. In this regard, the one or more validation checks may be performed as part of an obligation/settlement process. For example, the one or more validation checks may comprise verifying that the user and/or account information is valid (e.g., the identity of the user matches the account information), the verification of account balances, timeframe validation, and the like. In some embodiments, the first DLT network 103 may comprise a notary node which performs additional functions as part of the first consensus mechanism. In such embodiments, the system may require the pending data record to be notarized by the notary node within a specified timeframe in order to be validated. The notary node may additionally reject a transaction if a double spend is attempted.

The process continues to block 303, where the system appends the pending data record to the first distributed register. At this stage, the system may consider the pending data record to be a permanent part of the first distributed register. The register balance may then be updated and displayed to a user (e.g., the client of the entity, an employee of the entity, and the like).

The process continues to block 304, where the system transmits the transaction information via a first network services node. The first network services node, as a part of the first DLT network 103, may be configured to read the data records within the first distributed register. In this regard, the first distributed register may comprise a smart contract configured to automatically transmit the information associated with the resource transfer (e.g., transaction information) to a second network services node once the pending data record has been validated and appended to the first distributed register. The first network services node and second network services node may form an interoperability layer 350 which allows for real-time or near real-time settlement of transactions across otherwise incompatible distributed register technologies.

The process continues to block 305 within the second DLT network 104, where the system receives the transaction information via a second network services node. The second network services node, as a part of the second DLT network 104, may be configured to read the data records within the second distributed register. In this regard, the second network services node may make the transaction information available to the remaining nodes within the second DLT network 104.

The process continues to block 306, where the system generates a second pending data record comprising the transaction information. In some embodiments, the second pending data record may be proposed by the second network services node. For instance, the second distributed register may comprise a smart contract which causes the second network services node to automatically generate the second pending data record upon receiving the transaction information from the first network services node.

The process continues to block 307, where the system validates the second pending data record via a second consensus mechanism. Based on the transaction information within the second pending data record, the nodes of the second DLT network 104 may perform their own settlement processes to validate the transaction (e.g., verifying user/account information, transaction amounts, timeframes, account balances, and the like).

The process concludes at block 308, where the system appends the second pending data record to the second distributed register. At this stage, the system may consider the second pending data record to be a permanent part of the second distributed register. The account balances of the recipient may be updated in the manner described herein and displayed to a second user (e.g., the recipient, an entity of the second DLT network 104, and the like). In some embodiments, the smart contract may further cause the second network services node to automatically transmit a notification to the first network services node, where the notification indicates that the second pending data record has been successfully validated. In this way, the system may provide interoperability between disparate, heterogenous DLT networks and allow cross-network process and transactions to be executed efficiently and automatically.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for integration and interoperability between disparate distributed server technologies, the system comprising:
    a memory device with computer-readable program code stored thereon;
    a communication device; and
    a processing device operatively coupled to the memory device and the communication device, wherein the processing device is configured to execute the computer-readable program code to:
        generate, within a first distributed server network, a pending data record comprising a request to execute a resource transfer;
        validate the resource transfer via a first consensus mechanism;
        append the pending data record to a first distributed register implemented on a first distributed register technology platform; and
        transmit, via a first network services node, information associated with the resource transfer to a second network services node of a second distributed server network, wherein the second network services node is configured to:
            receive the information associated with the resource transfer;
            generate a second pending data record comprising the information associated with the resource transfer;
            validate the second pending data record via a second consensus mechanism; and
            append the second pending data record to a second distributed register implemented on a second distributed register technology platform, wherein the first distributed register technology platform and the second distributed register technology platform differ in at least one of data structures, consensus mechanisms, and encryption requirements.

2. The system according to claim 1, wherein the second network services node is configured to execute a smart contract to automatically transmit a notification to the first network services node, wherein the notification indicates that the second pending data record has been validated by the second network services node.

3. The system according to claim 1, wherein validating the first pending data record comprises performing one or more validation checks on the information associated with the resource transfer.

4. The system according to claim 3, wherein the one or more validation checks comprises verification of user information and account information.

5. A computer program product for integration and interoperability between disparate distributed server technologies, the computer program product comprising at least one non-transitory computer readable medium having computer-readable program code portions embodied therein, the computer-readable program code portions comprising executable code portions for:
    generating, within a first distributed server network, a pending data record comprising a request to execute a resource transfer;
    validating the resource transfer via a first consensus mechanism;
    appending the pending data record to a first distributed register implemented on a first distributed register technology platform; and
    transmitting, via a first network services node, information associated with the resource transfer to a second network services node of a second distributed server network, wherein the second network services node is configured to:
        receive the information associated with the resource transfer;
        generate a second pending data record comprising the information associated with the resource transfer;
        validate the second pending data record via a second consensus mechanism; and
        append the second pending data record to a second distributed register implemented on a second distributed register technology platform, wherein the first distributed register technology platform and the second distributed register technology platform differ in at least one of data structures, consensus mechanisms, and encryption requirements.

6. The computer program product according to claim 5, wherein the second network services node is configured to execute a smart contract to automatically transmit a notification to the first network services node, wherein the notification indicates that the second pending data record has been validated by the second network services node.

7. The computer program product according to claim 5, wherein validating the first pending data record comprises performing one or more validation checks on the information associated with the resource transfer.

8. The computer program product according to claim 7, wherein the one or more validation checks comprises verification of user information and account information.

9. A computer-implemented method for integration and interoperability between disparate distributed server technologies, wherein the computer-implemented method comprises:
    generating, within a first distributed server network, a pending data record comprising a request to execute a resource transfer;
    validating the resource transfer via a first consensus mechanism;
    appending the pending data record to a first distributed register implemented on a first distributed register technology platform; and transmitting, via a first network services node, information associated with the resource transfer to a second network services node of a second distributed server network, wherein the second network services node is configured to:
receive the information associated with the resource transfer;
generate a second pending data record comprising the information associated with the resource transfer;
validate the second pending data record via a second consensus mechanism; and
append the second pending data record to a second distributed register implemented on a second distributed register technology platform, wherein the first distributed register technology platform and the second distributed register technology platform differ in at least one of data structures, consensus mechanisms, and encryption requirements.

10. The computer-implemented method according to claim 9, wherein the second network services node is configured to execute a smart contract to automatically transmit a notification to the first network services node, wherein the notification indicates that the second pending data record has been validated by the second network services node.

11. The computer-implemented method according to claim 9, wherein validating the first pending data record comprises performing one or more validation checks on the information associated with the resource transfer.

12. The computer-implemented method according to claim 11, wherein the one or more validation checks comprises verification of user information and account information.

* * * * *